United States Patent
West et al.

(10) Patent No.: US 8,305,727 B2
(45) Date of Patent: Nov. 6, 2012

(54) AIRCRAFT JOINT AND BONDING LEAD

(75) Inventors: Colin John West, Bristol (GB); David Alistair Sutton, Bristol (GB); Robert Bernard Malia, Bristol (GB); Richard Edward Mills, Bristol (GB); Alan Donald Pout, Bristol (GB)

(73) Assignee: Airbus Operations Limited, Bristol (GB)

( * ) Notice: Subject to any disclaimer, the term of this patent is extended or adjusted under 35 U.S.C. 154(b) by 217 days.

(21) Appl. No.: 12/719,279

(22) Filed: Mar. 8, 2010

(65) Prior Publication Data

US 2010/0226063 A1 Sep. 9, 2010

(30) Foreign Application Priority Data

Mar. 9, 2009 (GB) .................................. 0904007.2
Oct. 29, 2009 (GB) .................................. 0918967.1

(51) Int. Cl.
*H05F 3/00* (2006.01)
(52) U.S. Cl. ........................................ 361/218; 361/212
(58) Field of Classification Search .................. 361/218, 361/212, 220
See application file for complete search history.

(56) References Cited

U.S. PATENT DOCUMENTS

| | | | | |
|---|---|---|---|---|
| 3,861,721 | A * | 1/1975 | Berghofer | 285/236 |
| 4,800,374 | A * | 1/1989 | Jacobson | 340/649 |
| 5,786,977 | A | 7/1998 | Cohen | |
| 6,268,426 | B1 | 7/2001 | Hirabayashi et al. | |
| 7,576,966 | B2 * | 8/2009 | Heeter | 361/215 |
| 2003/0040215 | A1 | 2/2003 | Kleen | |
| 2008/0078880 | A1 | 4/2008 | Petit | |
| 2008/0102660 | A1 * | 5/2008 | Wittwer | 439/100 |
| 2009/0256352 | A1 * | 10/2009 | Petit et al. | 285/123.15 |

FOREIGN PATENT DOCUMENTS

| | | |
|---|---|---|
| CN | 101412835 | 11/2008 |
| EP | 0975911 A1 | 2/2000 |
| EP | 1484245 A1 | 12/2004 |
| GB | 2295594 A | 6/1996 |
| JP | 3047298 A | 7/1989 |
| JP | 2002117914 A | 10/2000 |
| WO | 98/48207 A1 | 10/1998 |

OTHER PUBLICATIONS

Timothy Russell et al., "The use carbon nanotubes to improve conductive elastomers," Sealing Technology, Nov. 2005, pp. 12-14.
UK Search Report for GB0904006.4 dated Jul. 8, 2009.
UK Search Report for GB0918967.1 dated Feb. 25, 2010.
UK Search Report for GB0904007.2 dated Jul. 9, 2009.

* cited by examiner

*Primary Examiner* — Danny Nguyen
(74) *Attorney, Agent, or Firm* — Lowe, Hauptman, Ham & Berner, LLP

(57) ABSTRACT

A joint on an aircraft, the joint comprising: a first component; a second component joined to the first component; and a bonding lead which forms an electrical connection between the components with a resistance between 100 k$\Omega$ and 10 M$\Omega$. Surprisingly, it has been found that a bonding lead with a relatively high resistance can be used without seriously compromising the static discharge performance of the bonding lead, and that the resulting comparatively low flow of current reduces the risk of sparking in the event of an lightning strike. Bonding leads may be provided as a kit of parts in which at least two of the bonding leads have different lengths and the longer lead is formed from a material having a higher bulk conductivity than the shorter lead. Thus the bonding leads can be made with approximately similar resistances regardless of their lengths.

15 Claims, 7 Drawing Sheets

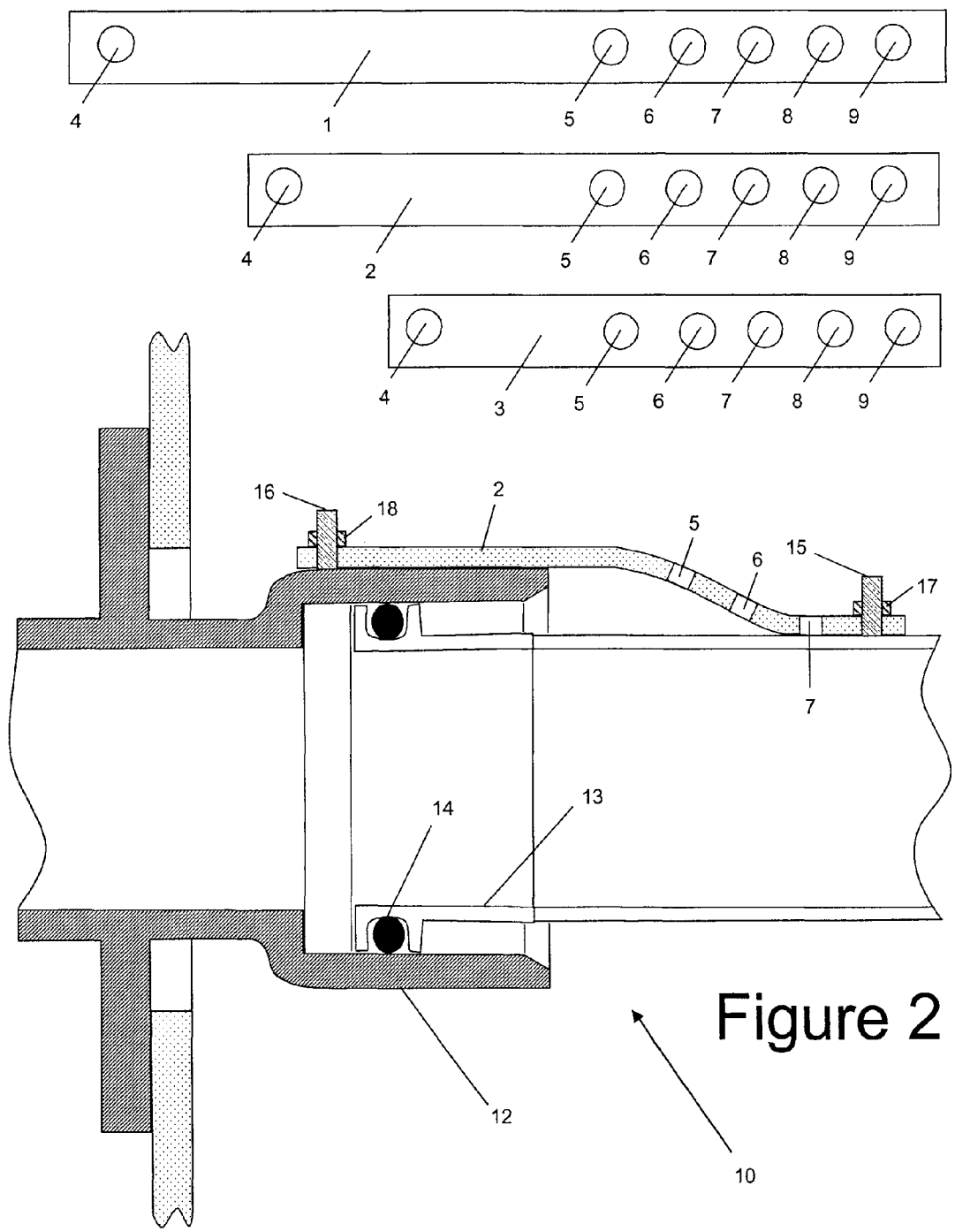

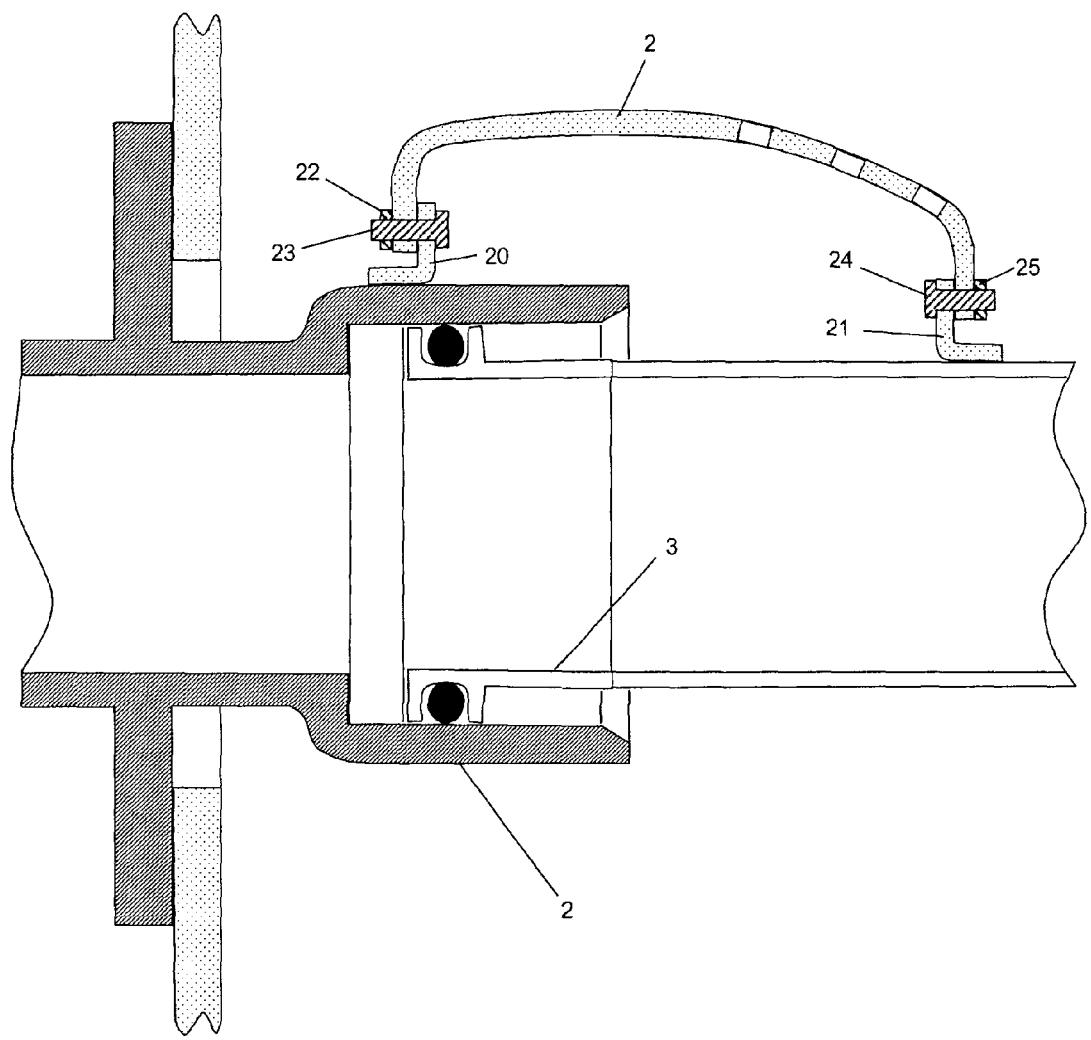

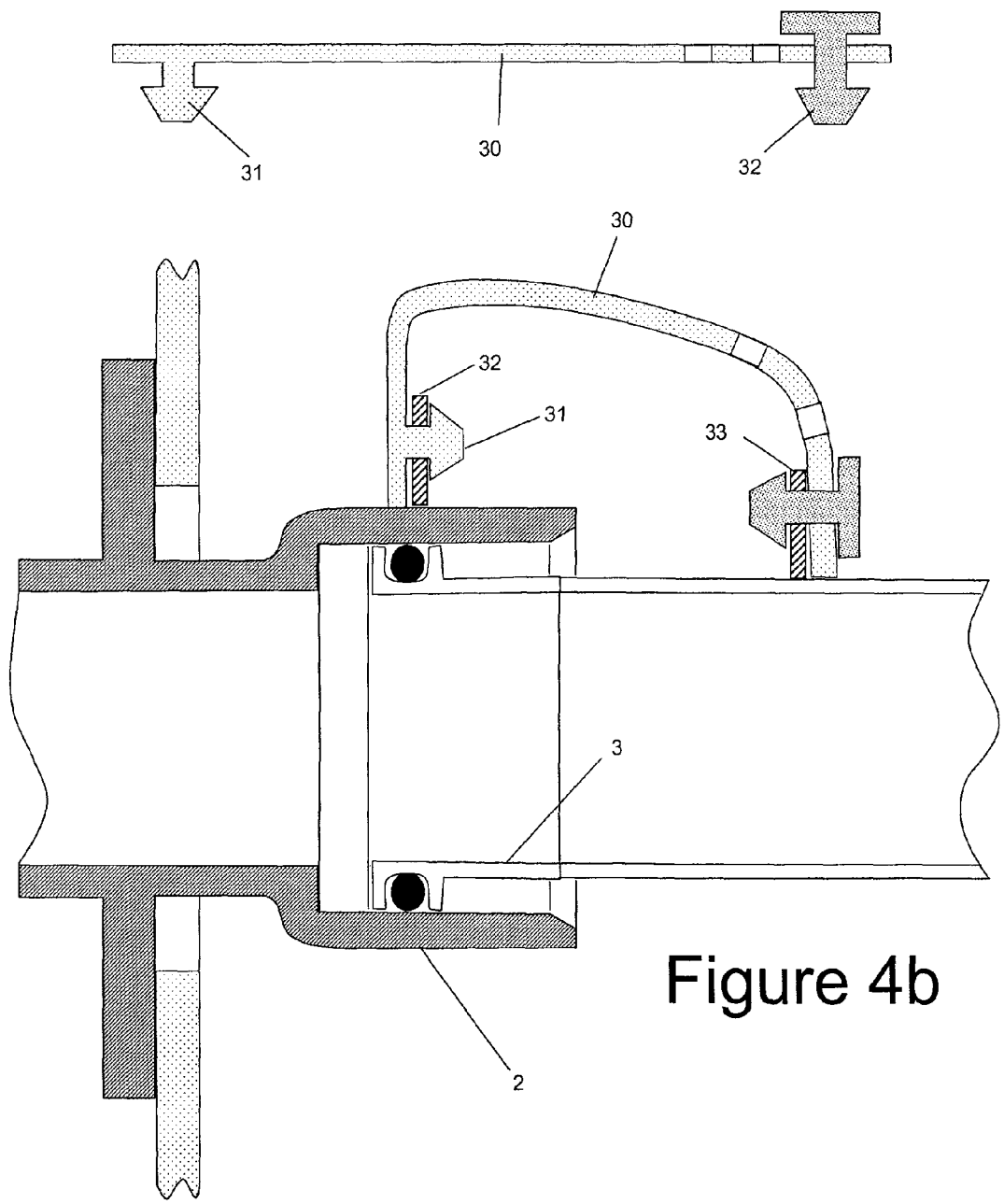

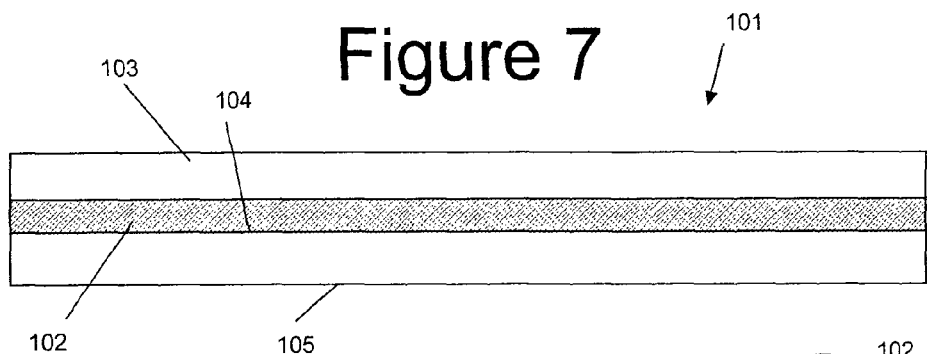
Figure 7
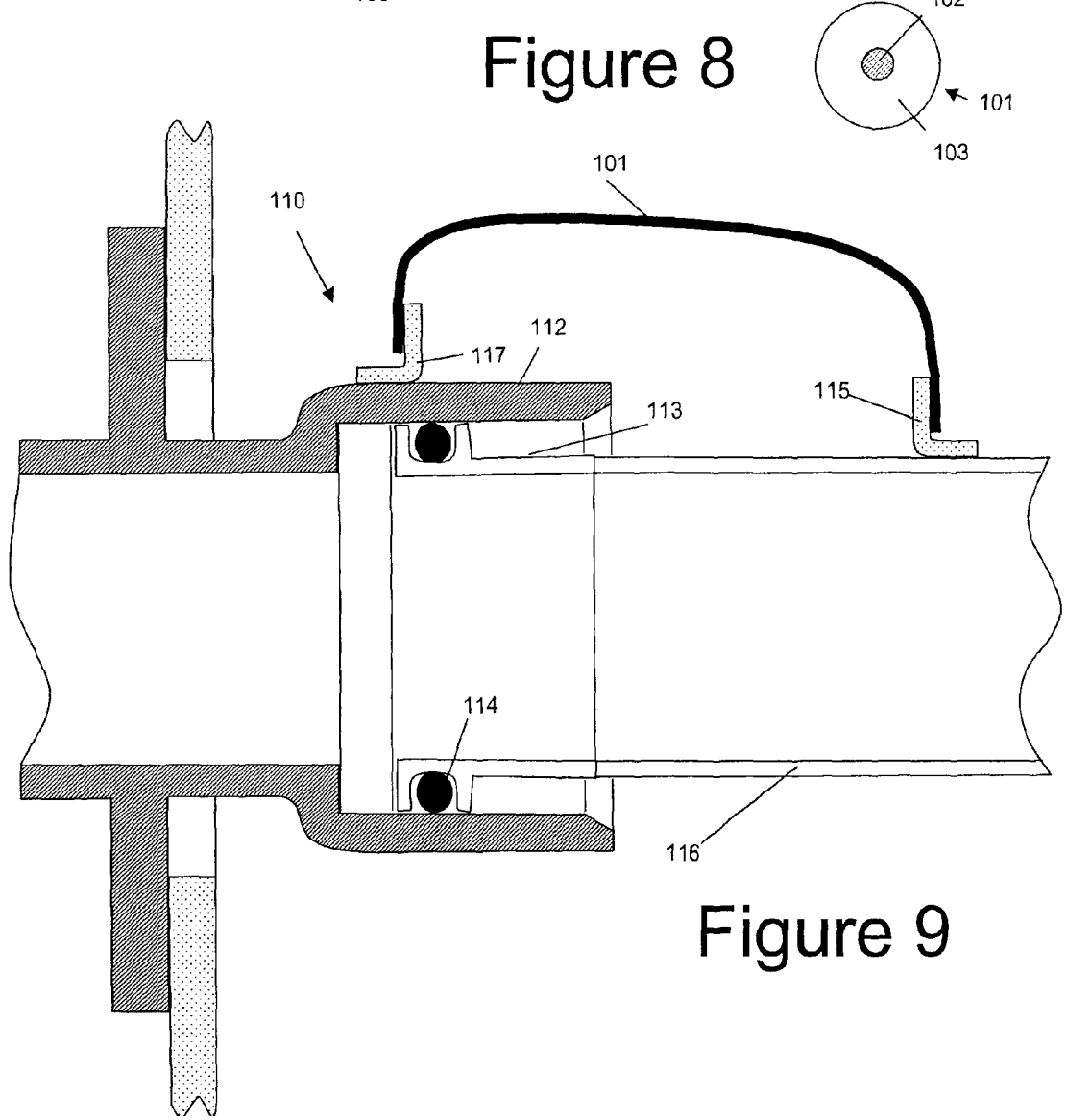
Figure 8
Figure 9

AIRCRAFT JOINT AND BONDING LEAD

RELATED APPLICATIONS

The present application is based on, and claims priority from, British Application Number 0904007.2, filed Mar. 9, 2009, the disclosure of which is hereby incorporated by reference herein in its entirety.

FIELD OF THE INVENTION

The present invention relates to an aircraft joint, a bonding lead for use in such a joint, a method of preventing sparking across such a joint, and a kit of parts comprising two or more bonding leads.

BACKGROUND OF THE INVENTION

There is a risk in aircraft fuel systems of a build up of static electricity on one component in comparison to another component to which it is connected. In the prior art, a so-called bonding lead is connected to each side of the joint in order to electrically connect the components and prevent static build up. An example of such a bonding lead is described in the prior art section of US2008/0078880.

Bonding leads are traditionally made of highly conductive materials in different forms. These satisfy equipotential and electrostatic discharge requirements but allow the flow of lightning current across the joint. There is a risk that a break in such a bonding lead can result in intermittent contact and a source of sparking should high levels of electricity flow in the lead, for instance during a lightning strike.

An example of this problem is shown in FIGS. 14 and 15. A bonding lead 62 couples a pair of fuel pipes 60, 61 across a joint between the pipes. The pipes are fitted within a fuel tank, close to a fuel tank wall 63. If the lead 62 breaks, the resulting two parts 62a, 62b will hang down as shown in FIG. 15 and there is a risk that one of the parts (in this case 62b) will make intermittent contact with the fuel tank wall 63.

The present invention seeks to reduce this risk but continue to ensure that static charge cannot build to nuisance or dangerous levels.

SUMMARY OF THE INVENTION

A first aspect of the invention provides a joint on an aircraft, the joint comprising: a first component; a second component joined to the first component; and a bonding lead which forms an electrical connection between the components with a resistance between 100 k$\Omega$ and 10 M$\Omega$.

A further aspect of the invention provides a method of preventing sparking across a joint on an aircraft, the method comprising: electrically connecting components of the joint with each other with a bonding lead, the bonding lead having an electrical resistance between 100 k$\Omega$ and 10 M$\Omega$; dissipating static charge between the components by means of the bonding lead; and passing lightning current between the components by means of the bonding lead.

Surprisingly, it has been found that a bonding lead with a relatively high resistance can be used without seriously compromising the static discharge performance of the bonding lead, and that the resulting comparatively low flow of current reduces the risk of sparking in the event of a lightning strike.

Typically the bonding lead has a resistance lower than 1 M$\Omega$.

Typically the bonding lead has a resistance higher than 200 k$\Omega$

The bonding lead may be provided with connection holes or other means for connecting the bonding lead to the first and/or second component. In this case the bonding lead may have two or more connection holes arranged in a line at one end of the bonding lead, whereby the bonding lead can be cut to size by cutting between an adjacent pair of the two or more connection holes. In this case typically only a single hole is provided at the other end.

The bonding lead may have a spring-like shape, such as a corrugated or helical shape.

Typically at least part of the bonding lead comprises an elastomer loaded with a conductive filler and which forms at least part of the path of least electrical resistance provided by the bonding lead. The conductive filler may be carbon, preferably in the form of carbon black or carbon nanotubes. The concentration of the conductive filler is selected such that the part of the path of least electrical resistance formed by the elastomer has a resistance between 100 k$\Omega$ and 10 M$\Omega$, or more preferably between 100 k$\Omega$ and 1 M$\Omega$. The bonding lead may consist solely of elastomer loaded with conductive filler. Alternatively the bonding lead may comprise a conductive core (which may be metallic or may comprise an elastomer loaded with a conductive filler) and a sheath which comprises an elastomer loaded with a conductive filler, covers a substantial length of the core and has a lower electrical conductivity than the core, wherein the path of least electrical resistance between the first component and the core of the bonding lead comprises the sheath.

One or both of the components in the joint may be a fuel pipe, a hydraulic pipe, an air pipe, a wall of a fuel tank, an access panel in a wall of a fuel tank, or any other part of an aircraft which is in contact with fuel when in use (in liquid or vapour form) or has the potential of doing so.

The bonding lead may be held at a first end, and optionally at a second end, by a strap which passes around a respective pipe and clamps the bonding lead against the pipe.

The bonding lead may be provided on a roll which is cut to size as required to produce a set of individual leads. However a problem with this is that the leads may be cut to the wrong lengths, resulting in an electrical resistance which is either too high or too low. Thus a further aspect of the invention provides a kit of parts comprising two or more bonding leads with an electrical resistance between 100 k$\Omega$ and 10 M$\Omega$, wherein at least two of the bonding leads have different lengths and the longer lead(s) is formed from a material having a higher bulk conductivity than the shorter lead(s). Thus the bonding leads can be made with approximately similar resistances regardless of their lengths.

A further aspect of the invention provides a bonding lead with an electrical resistance between 100 k$\Omega$ and 10 M$\Omega$, wherein at least part of the bonding lead is formed from an elastomer loaded with a conductive filler, and wherein the concentration of the conductive filler is selected such that the electrical resistance of the bonding lead is between 100 k$\Omega$ and 10 M$\Omega$.

BRIEF DESCRIPTION OF THE DRAWINGS

Embodiments of the invention will now be described with reference to the accompanying drawings, in which:

FIG. 1 shows a kit of three bonding leads according to an embodiment of the invention;

FIG. 2 is a sectional view of a joint according to an embodiment of the invention;

FIG. 3 is a sectional view of the joint of FIG. 2 with a first alternative connection arrangement;

FIG. 4 is a sectional view of the joint of FIG. 2 with a second alternative connection arrangement;

FIG. 7 is a longitudinal sectional view of a two-part bonding lead according to an embodiment of the invention;

FIG. 8 is an end view of the bonding lead of FIG. 7;

FIG. 9 is a sectional view of a joint according to an embodiment of the invention;

DETAILED DESCRIPTION OF EMBODIMENT(S)

Figure 5:
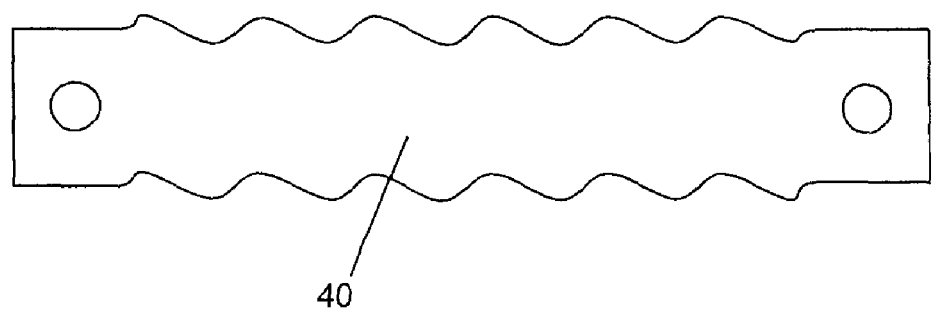
FIG. 5 shows a corrugated bonding lead.

FIG. 1 shows a kit of parts comprising three bonding leads 1-3. Each bonding lead comprises a conductive elastomer: that is, an elastomer loaded with conductive filler. One suitable filler material would be a fluorosilicone loaded with carbon black particles or carbon nanotubes.

The elastomer is reinforced by a fabric element (not shown). This fabric may be formed from a conductive material if desired to increase the electrical conductivity of the bonding lead. This may be necessary for longer lengths of bonding leads.

Each bonding lead is pre-cut with a first attachment hole 4 at one end, and a set of five attachment holes 5-9 in a line at the other end. The leads 1-3 have different lengths which can be selected in accordance with the geometry of the joint. Also, one of the attachment holes 5-9 can be selected as required. Thus for example the attachment hole 5 can be selected to give a minimum length (and hence minimum resistance) or the hole 9 selected to give a maximum length (and hence a maximum resistance).

The leads 1-3 are formed from materials having different bulk conductivities, so that their resistances are approximately equal. That is, the concentration of nanotubes is greatest for the material forming the longest lead 1, and least for the material forming the shortest lead 3.

FIG. 2 shows a fuel pipe joint 10 on an aircraft. The joint comprises a socket 12, in which a pipe end fitting 13 is located, an O-ring seal 14 sealing the contact between the socket and the pipe end fitting, and a threaded connection shaft 15 welded to the fuel pipe connected to the pipe end fitting 13. A further threaded connection shaft 16 is machined on the socket arrangement and a bonding lead is arranged between the two connection shafts 15, 16 electrically connecting one side of the joint to the other. The bonding lead 2 provides the path of least electrical resistance between the two components, the O-ring seal 14 being highly resistive.

In the example of FIG. 2, bonding lead 2 has been used, and the hole 8 has been selected to receive the connection shaft 15. Nuts 17, 18 are fitted onto the connection shafts 15,16 to press the bonding lead against the fuel pipe and socket 12 respectively. After the lead has been connected it is cut by a knife or pair of scissors between the hole 8 and the hole 9, to remove the excess length.

An alternative connection arrangement for the bonding lead is shown in FIG. 3. In this case L-section brackets 20, 21 made of reinforced elastomer are bonded or co-cured in place as shown. The bonding lead 2 is secured to the brackets by nuts 22, 25 and bolts 23, 24.

A further alternative bonding lead arrangement is shown in FIGS. 4a and 4b. In this case the bonding lead 30 comprises an integral fastener 31 at one end, and three holes arranged in a line at the other end. A removable fastener 32 is shown in FIG. 4a fitted into the end one of the holes. The fastener 32 may moulded from a resilient plastic material, or formed from metal with a pair of resilient arms.

The bonding lead 30 is fitted to a joint as shown in FIG. 4b. The integral fastener 31 is fitted into a hole in a tab 32, the sides of the head of the fastener compressing as they pass through the hole and then springing back to their original shape as shown in FIG. 4b to lock into place. The fastener 32 is then passed through a selected one of the holes in the bonding lead (in this case the end hole has been selected) and fitted to a tab 33 in a similar manner to the fastener 31.

FIG. 5 shows an alternative bonding lead 40 formed with a spring-like sinusoidal corrugated shape. This enables the bonding lead to expand and contract in the manner of a spring. Other spring geometries may also be used such as helical.

Figure 6:
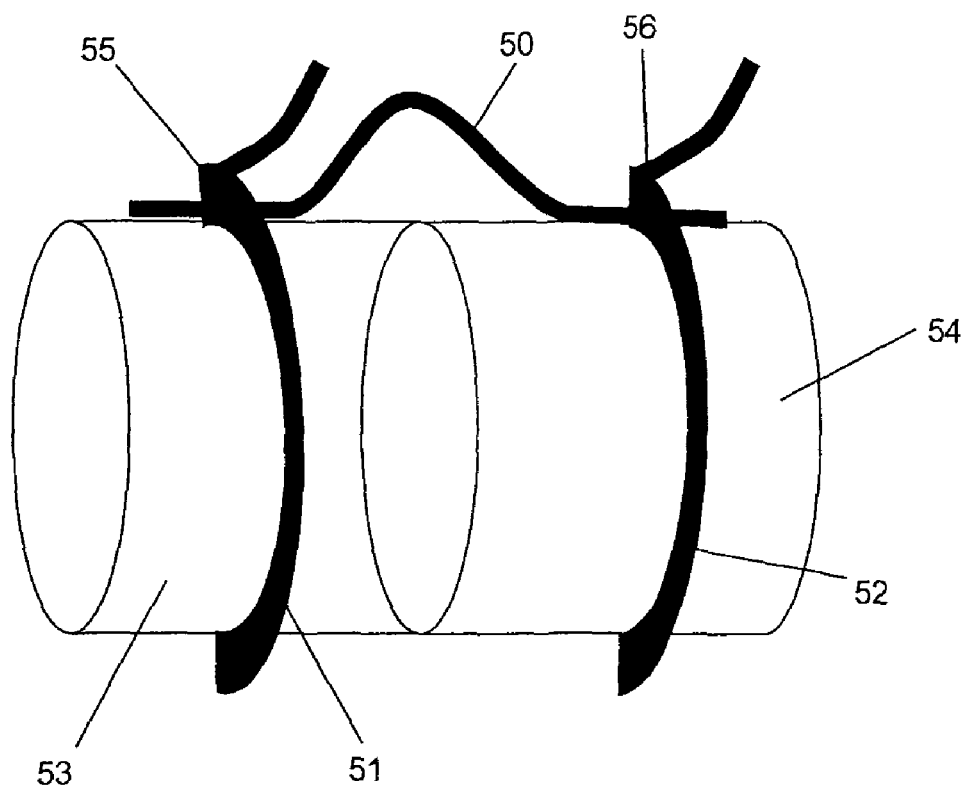
FIG. 6 shows a pair of straps clamping a bonding lead to a pair of fuel pipes.

FIG. 6 shows a further alternative bonding lead arrangement. A bonding lead 50 (with no holes) is clamped against a pair of fuel pipes 53, 54 by straps 51, 52 which pass around the fuel pipes 53, 54 and are secured by cable-tie fittings 55, 56.

The various bonding leads described above are formed from a conductive elastomer: that is, an elastomer mixed with a conductive filler such as carbon black. The bonding leads are designed to form an electrical connection between the components with a relatively high electrical resistance—between 100 k$\Omega$ and 10 M$\Omega$, or more typically between 200 k$\Omega$ and 1 M$\Omega$.

The benefits of the elastomeric bonding leads shown in FIGS. 1-6 are detailed below:

The elastomer and reinforcing fabric both have lower densities than the conventional metallic design, copper (8.23) compared to elastomer (1.1-1.3), enabling a potential weight saving.

The reinforced elastomer bonding lead can be produced as a simple moulded part, which is a relatively low cost process, whereas conventional bonding leads are constructed from multiple complex components with a multiple stage manufacturing process.

The bonding lead can be connected to the structure using "snap & click" technology as shown in FIG. 4b, or simplified tools.

A single bonding lead size can connect bonding points over a range of separation distances, reducing the number of different bonding lead lengths required.

The lead is produced as a single moulded part that is attached to the structure; some attachment systems can be incorporated into the lead as an integral part (as in FIG. 4a) further reducing the number of parts.

The number of holes in the structure required to attach bonding leads would not be increased, certain designs (for instance FIG. 6) removing the need for holes in the structure entirely.

The use of elastomer removes causes of component failure of metallic bonding leads, extending the service life to potentially the life of the aircraft. The service life of surrounding structure could also be extended, as damage due to impact with an elastomeric bonding lead is less damaging than a metallic bonding lead.

Reduced material compatibility issues between the bonding lead and the surrounding structure, for example galvanic corrosion.

No corrosion issues with the elastomer.

Elastomeric components require no finishing, plating or coating.

Greatly reduced fatigue issues.

Reduced fretting between individual wires.

FIGS. 7 and 8 show a bonding lead 101 comprising an electrically conductive core 102 and a sheath 103.

The core 102 may be formed from a variety of highly conductive materials: for instance a metal such as copper; carbon rope; lightweight carbon nanotube wiring; or an elastomer loaded with a conductive filler dispersed throughout the elastomer. Suitable elastomers include fluorosilicone and suitable fillers include carbon black or carbon nanotubes.

The sheath 103 is formed from an elastomer loaded with a conductive filler dispersed throughout the elastomer. Suitable elastomers include fluorosilicone and suitable fillers include carbon black or carbon nanotubes.

The core 102 and the sheath 103 may be formed from the same elastomeric matrix material and the same conductive filler (such as carbon nanotubes) but with the density of the conductive filler being higher in the core 102 than in the sheath 103.

The sheath 103 protects the core 102 and extends along its full length. The core 102 may be exposed at each end as shown in FIG. 7, or may be fully encapsulated by the sheath, including at both ends.

As well as protecting the core 102, the sheath 103 also minimises damage to surrounding structure due to impact with the bonding lead, as well as reducing fretting between any adjacent bonding leads, since the elastomeric material is relatively soft and thus less damaging than an unsheathed metallic bonding lead. The sheath 103 also reduces material compatibility issues between the bonding lead and the surrounding structure, for example galvanic corrosion.

FIG. 9 shows a fuel pipe joint 110 on an aircraft. The joint comprises a socket 112, in which a pipe end fitting 113 is located, an O-ring seal 114 sealing the contact between the socket and the pipe end fitting, and a connection tab 115 welded to the fuel pipe 116 connected to the pipe end fitting 113. A further connection tab 117 is machined on the socket 112 and the bonding lead 101 is arranged between the two connection tabs 115, 117 to provide an electrical pathway connecting one side of the joint to the other. The bonding lead 101 provides the path of least electrical resistance between the two components, the O-ring seal 114 being highly resistive.

The bonding lead 101 is designed to form an electrical connection between the connection tabs 115, 117 with a relatively high electrical resistance—between 100 kΩ and 10 MΩ, or more typically between 200 kΩ and 500 kΩ.

This is achieved by suitable selection of the following parameters:

the density of conductive filler in the sheath the thickness of the sheath

Note that the conductivity of the material forming the sheath is much lower than the conductivity of the core (typically by a factor of more than 100) but also much higher than the conductivity of conventional electrical cable sheaths.

Figure 10:
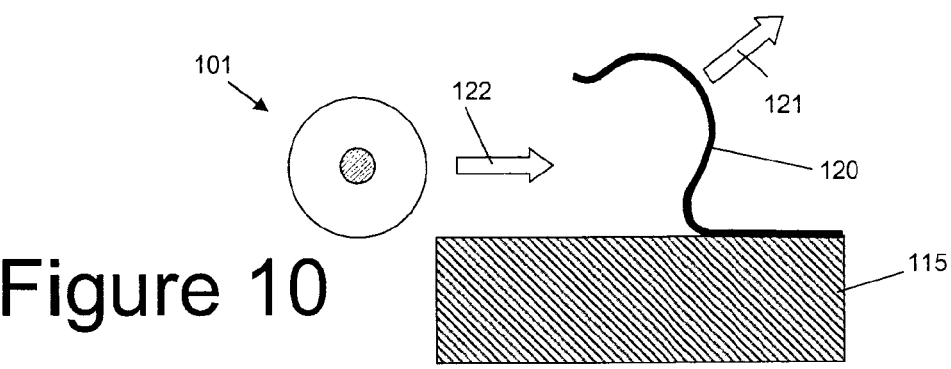
FIG. 10 is a sectional view showing a connection clip being pulled back and the bonding lead inserted.
Figure 11:
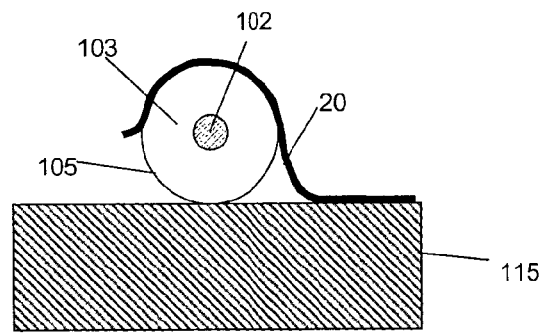
FIG. 11 is a sectional view showing the clip clamping the bonding lead against a connection tab.
Figure 12:
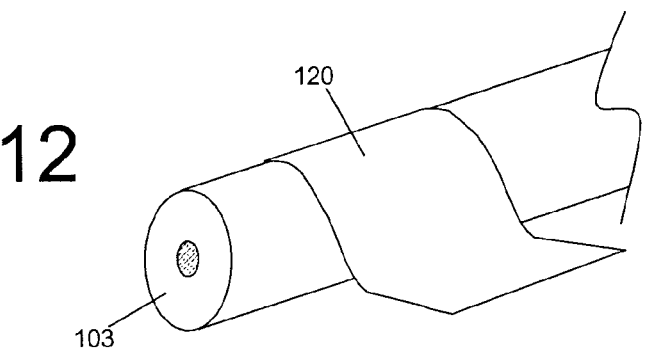
FIG. 12 is a perspective view of the arrangement of FIG. 11 but with the tab omitted.

FIG. 10 is a sectional view showing how the bonding lead 101 is attached to the connection tab 115. A similar connection arrangement is provided between the bonding lead and the other tab 117. A resilient clip 120 is bolted to the tab by a bolt (not shown) and pulled back as indicated by arrow 121 so the lead 101 can be pushed into place as shown by arrow 122. The clip 120 is then released and springs back into place, clamping the outer surface 105 of the sheath to the tab 115 as shown in FIG. 11. FIG. 12 is a perspective view which shows the clip 120 but omits the tab 115.

The clip 120 may be formed from metal, or a non-conducting material. Optionally the sheath 103 may be formed with a series of annular grooves, spaced apart along the length of the cable, each groove having a width approximately the same as the width of the clip 120. The clip 120 can then be received in the groove to prevent the bonding lead from slipping lengthwise relative to the clip.

In contrast with a conventional connection with a sheathed electrical cable (in which the sheath is removed to enable a low resistance connection to be made with the conductive core) the path of least electrical resistance along the bonding lead 101 between the tab 115 and the core 102 is provided by the sheath 103 in series with the core 102. The same arrangement is present at the other end of the cable, so the path of least resistance between the tabs 115 and 117 runs along the length of the core and through the sheath at both ends. As a result substantially all of the current conducted by the bonding lead is carried along a relatively high resistance electrical pathway which comprises the sheath at both ends in series with the core.

The bonding lead is provided on a roll, and any desired length of the lead can be cut from the roll depending on the distance between the tabs 115, 117. Since the electrical resistance along the length of the core is negligible, the total resistance of the bonding lead between the tabs 115, 117 is approximately twice the resistance of the path across the sheath, regardless of the length of the lead.

Figure 13:
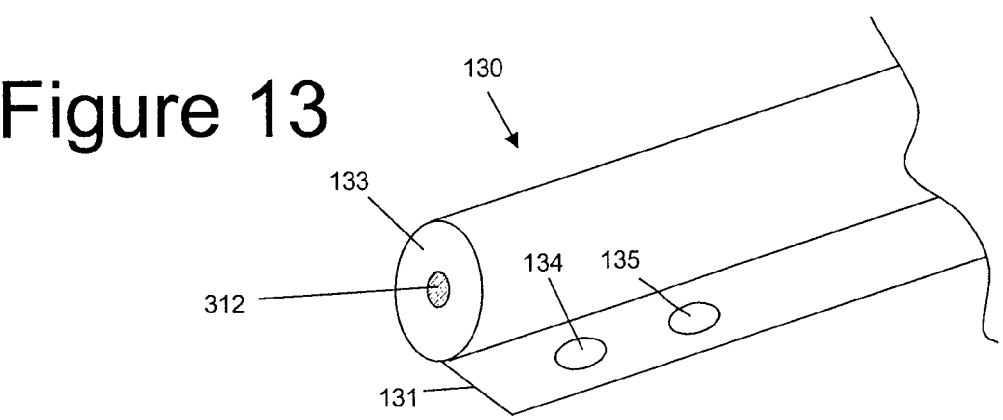
FIG. 13 is a perspective view showing a bonding lead according to a further embodiment of the invention.
Figure 14:
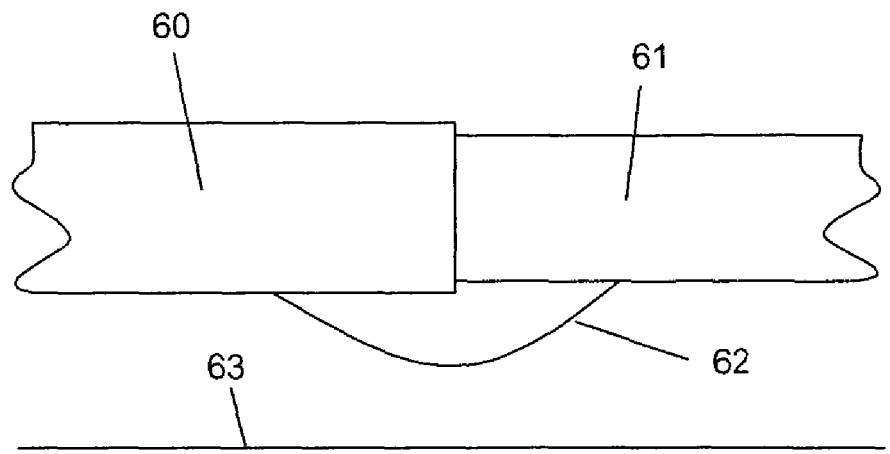
FIG. 14 is a schematic view of a conventional high conductivity bonding lead.

An alternative bonding lead 130 is shown in FIG. 13. The lead 130 is identical to the lead 101, the only difference being the provision of a connection flange 131 which is integrally moulded with the sheath 133 and formed from the same material. The flange 131 runs along the full length of the bonding lead. After a suitable length of cable has been cut from the roll, a pair of bolt holes 134, 135 is punched into the flange 131 at each end. Alternatively bolt holes may be pre-formed along the length of the flange. The flange 131 is attached to one of the connection tabs 115, 117 by bolts (not shown) which pass through the bolt holes 134, 135 and the tab 115, 117. The bolts are electrically conductive so as to form a low resistance connection between the tab 115, 116 and the flange 131.

In this case the path of least electrical resistance between each bolt and the core 132 comprises a first path across the flange between the bolt and the edge of the sheath 133, and a second path between the inner and outer surfaces of the sheath 133. Therefore the electrical conductivity of the sheath may need to be slightly higher than in the embodiment of FIGS. 7-12 to ensure that the total electrical resistance of the bonding lead falls within the correct range.

Figure 15:
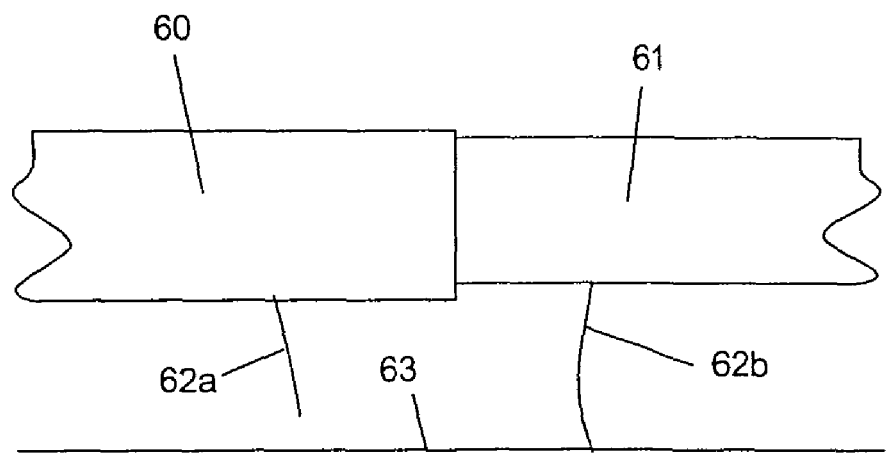
FIG. 15 shows the bonding lead in a broken state.

If either of the bonding leads 101, 130 breaks, resulting in one of the halves making intermittent contact with the fuel tank wall (as in FIG. 15), then the risk of sparking is mitigated by two factors:

the relatively high resistance of the bonding lead limits the current flow; and the fact that the metallic core is shielded along its length reduces the risk of intermittent contact compared with the case of an unshielded metal bonding lead as in FIG. 15.

Although the invention has been described above with reference to one or more preferred embodiments, it will be appreciated that various changes or modifications may be made without departing from the scope of the invention as defined in the appended claims.

The invention claimed is:

1. A joint on an aircraft, the joint comprising: a first component; a second component joined to the first component; and a bonding lead which forms an electrical connection between the components with a resistance between 100 kΩ and 10 MΩ, wherein said resistance inhibits current flow through the bonding lead to thereby inhibit sparking at the bonding lead.

2. The joint of claim 1 wherein the first and second components comprise pipes.

3. The joint of claim 1 wherein the bonding lead is held at the first end, and optionally at the second end, by a strap which passes around a respective pipe and clamps the bonding lead against the pipe.

4. The joint of claim 1 wherein at least one of the components comprises a wall of a fuel tank.

5. The joint of claim 1, wherein the electrical connection formed by the bonding lead has a path of least electrical resistance between 100 kΩ and 10 MΩ.

6. A joint on an aircraft, the joint comprising: a first component; a second component joined to the first component;
a bonding lead which forms an electrical connection between the components with a resistance between 100 kΩ and 10 MΩ,
wherein the electrical connection formed by the bonding lead has a path of least electrical resistance between 100 kΩ and 10 MΩ, and
wherein at least part of the path of least electrical resistance is formed from an elastomer loaded with a conductive filler, and wherein the concentration of the conductive filler is selected such that the part of the path of least electrical resistance formed by the elastomer has a resistance between 100 kΩ and 10 MΩ.

7. A joint on an aircraft, the joint comprising: a first component; a second component joined to the first component;
a bonding lead which forms an electrical connection between the components with a resistance between 100 kΩ and 10 MΩ,
wherein the electrical connection formed by the bonding lead has a path of least electrical resistance between 100 kΩ and 10 MΩ
wherein at least part of the path of least electrical resistance is formed from an elastomer loaded with a conductive filler, and wherein the concentration of the conductive filler is selected such that the part of the path of least electrical resistance formed by the elastomer has a resistance between 100 kΩ and 10 MΩ, and
wherein the concentration of the conductive filler is selected such that the part of the path of least electrical resistance formed by the elastomer has a resistance between 100 kΩ and 1 MΩ.

8. A method of preventing sparking across a joint on an aircraft, the method comprising:
electrically connecting components of the joint with each other with a bonding lead, the bonding lead having an electrical resistance between 100 kΩ and 10 MΩ to inhibit current flow through the bonding lead and thereby inhibit sparking at the bonding lead;
dissipating static charge between the components by means of the bonding lead; and
passing lightning current between the components by means of the bonding lead.

9. A method of preventing sparking across a joint on an aircraft, the method comprising:
electrically connecting components of the joint with each other with a bonding lead, the bonding lead having an electrical resistance between 100 kΩ and 10 MΩ;
dissipating static charge between the components by means of the bonding lead; and
passing lightning current between the components by means of the bonding lead,
wherein at least part of the bonding lead is formed from an elastomer loaded with a conductive filler which dissipates the static charge and passes the lightning current.

10. A bonding lead with an electrical resistance between 100 kΩ and 10 MΩ, wherein at least part of the bonding lead is formed from an elastomer loaded with a conductive filler, and wherein the concentration of the conductive filler is selected such that the electrical resistance of the bonding lead is between 100 kΩ and 10 MΩ.

11. The bonding lead of claim 10 further comprising one or more connection holes for connecting the bonding lead to a component, the connection holes passing through the elastomer.

12. The bonding lead of claim 11 further comprising two or more connection holes arranged in a line at one end of the bonding lead and passing through the elastomer, whereby the bonding lead can be cut to size by cutting between an adjacent pair of the two or more connection holes.

13. The bonding lead of claim 10 wherein the concentration of the conductive filler is selected such that the electrical resistance of the bonding lead is between 100 kΩ and 1 MΩ.

14. A kit of parts comprising two or more bonding leads with an electrical resistance between 100 kΩ and 10 MΩ, wherein at least two of the bonding leads have different lengths and the longer lead is formed from a material having a higher bulk conductivity than the shorter lead.

15. The kit of claim 14, wherein the material comprises an elastomer loaded with conductive particles; and wherein the concentration of conductive particles is greater for the material forming the longer lead(s) than for the shorter lead(s).

* * * * *